(12) United States Patent
Bischoff

(10) Patent No.: US 9,149,002 B2
(45) Date of Patent: Oct. 6, 2015

(54) SIEVE FOR A COMBINE HARVESTER CLEANING DEVICE

(75) Inventor: Lutz Bischoff, Nuenschweiler (DE)

(73) Assignee: DEERE & COMPANY, Moline, IL (US)

( * ) Notice: Subject to any disclaimer, the term of this patent is extended or adjusted under 35 U.S.C. 154(b) by 465 days.

(21) Appl. No.: 13/585,502

(22) Filed: Aug. 14, 2012

(65) Prior Publication Data

US 2013/0210505 A1 Aug. 15, 2013

(30) Foreign Application Priority Data

Nov. 9, 2011 (DE) .................... 10 2011 085 977

(51) Int. Cl.
*A01F 12/32* (2006.01)
*B07B 1/00* (2006.01)
*A01F 12/44* (2006.01)

(52) U.S. Cl.
CPC ............ *A01F 12/448* (2013.01); *A01F 12/446* (2013.01)

(58) Field of Classification Search
CPC .............................. A01F 12/448; A01F 12/446
USPC ............ 460/101, 102, 902, 93, 120; 209/394, 209/395, 404, 405
See application file for complete search history.

(56) References Cited

U.S. PATENT DOCUMENTS

| | | | | | |
|---|---|---|---|---|---|
| 2,250,383 | A | * | 7/1941 | Koester | ............................ 209/22 |
| 2,362,099 | A | * | 11/1944 | Sargent | ......................... 209/394 |
| 2,554,416 | A | * | 5/1951 | Morrissey | ..................... 209/394 |
| 3,334,744 | A | * | 8/1967 | James et al. | ................... 209/394 |
| 3,385,438 | A | * | 5/1968 | Fisher | ........................... 209/394 |
| 4,502,493 | A | | 3/1985 | Jones et al. | |
| 4,511,466 | A | * | 4/1985 | Jones et al. | .................... 209/395 |
| 4,712,568 | A | * | 12/1987 | Strong et al. | ..................... 460/69 |
| 4,770,190 | A | * | 9/1988 | Barnett | ......................... 460/102 |
| 5,041,059 | A | * | 8/1991 | Ricketts et al. | ............... 460/101 |
| 5,085,616 | A | * | 2/1992 | Matousek et al. | .............. 460/10 |
| 5,176,574 | A | * | 1/1993 | Matousek et al. | ............ 460/100 |
| 5,489,029 | A | * | 2/1996 | Jonckheere et al. | .......... 209/676 |
| 5,525,108 | A | * | 6/1996 | Rouse et al. | ................... 460/101 |
| 5,795,223 | A | * | 8/1998 | Spiesberger et al. | ......... 460/102 |

(Continued)

FOREIGN PATENT DOCUMENTS

| | | |
|---|---|---|
| DE | 1923375 | 11/1970 |
| EP | 1068793 B1 | 1/2001 |

(Continued)

OTHER PUBLICATIONS

European Search Report, dated Mar. 19, 2013 (6 pages).

*Primary Examiner* — Thomas B Will
*Assistant Examiner* — Joan D Misa

(57) ABSTRACT

A sieve for a combine harvester cleaning device comprises a frame in which a plurality of similar transversely extending plates are mounted for angular adjustment about respective transverse axes defined by axles that are equally spaced from each other in the longitudinal direction. The plates are angled upward and rearward, with adjacent ones of the plates having forward sections of one overlapping rearward sections of the other. The axles include cranks that define adjusting elements which are received for interacting with slots provided in a longitudinally extending adjusting rod that can be adjusted in its position in the longitudinal direction of the sieve, relative to the frame, so as to be able to adjust the angles of the plates around their axles. The slots are shaped and arranged on the adjusting rod in such a way that at least one plate has an angle different from another plate.

9 Claims, 4 Drawing Sheets

(56) References Cited

U.S. PATENT DOCUMENTS

| | | |
|---|---|---|
| 6,468,154 B1 * | 10/2002 | Eggenhaus et al. ............ 460/101 |
| 6,632,136 B2 * | 10/2003 | Anderson et al. ............. 460/101 |
| 6,790,137 B2 * | 9/2004 | Gorden ........................ 460/102 |
| 7,371,162 B2 * | 5/2008 | Matousek et al. ............ 460/101 |
| 7,566,266 B1 | 7/2009 | Ricketts et al. |
| 7,896,731 B2 | 3/2011 | Schwinn |
| 7,997,967 B2 | 8/2011 | Ricketts et al. |
| 2006/0287019 A1 * | 12/2006 | Weichholdt et al. .......... 460/102 |
| 2010/0113113 A1 | 5/2010 | Ricketts et al. |

FOREIGN PATENT DOCUMENTS

| | | | | |
|---|---|---|---|---|
| EP | 1849351 A1 | 10/2007 | | |
| JP | 04187021 A | * | 7/1992 | .............. A01F 12/32 |
| JP | 06141661 A | * | 5/1994 | .............. A01F 12/32 |

\* cited by examiner

SIEVE FOR A COMBINE HARVESTER CLEANING DEVICE

FIELD OF THE INVENTION

The invention under consideration refers to a sieve for a combine harvester cleaning device, with a frame in which several similar plates, extending transversely to the longitudinal and swiveling direction of the sieve, are arranged one behind another, around rotating axes, extending transversely to the longitudinal direction of the sieve, so they rotate, in the frame, at the same intervals, and are provided with adjusting elements, which interact with suitable features of an adjusting rod, which can be adjusted in its position, relative to the frame, in the longitudinal direction of the sieve, so as to be able to adjust the angles of the plates around their rotating axles, by moving the adjusting rod in the longitudinal direction of the sieve, and thus, the intervals between the back ends of adjacent plates.

BACKGROUND OF THE INVENTION

Combine harvesters are used in agriculture for harvesting crops which are gathered from the field, threshed-out, and separated. The crops obtained by threshing and separating are subsequently freed from undesired crop residues in a cleaning. The cleaning comprises a blower, which acts on back and forth-moving sieves with an air flow, wherein lighter particles, such as chaff, are carried forth by the air flow and the grain falls through the sieves and is taken to a grain tank. As a rule, an upper sieve is placed above a lower sieve.

The usually used, so-called plate sieves are composed, for examine, like a sieve 8 shown in FIG. 1 and representing the state of the art (see, for example, EP 1 068 793 A1). The sieve 8 includes a rectangular frame 10 with plates 12, articulated, in a swiveling manner, around their longitudinal axles. The plates 12 are connected, in a fixed manner, with crankshafts 14, which engage in a slot 16 in an adjusting rod 18, which can move in a longitudinal direction of the sieve 8 with a manual or externally operated drive, so as to adjust the angle of the plates 12 and thus the opening size of the sieve 8—that is, the distance between the lower side of the back part of a plate 12 and the upper side of the back part of the downstream plate 12 and, if possible, to be able to adapt optimally to the individual harvesting conditions, such as grain size, lateral slope, and throughput. The plates 12 are cut in an undulating manner on their back ends and are also curved in an undulating manner in the transverse direction of the sieve 8. As can be seen in FIG. 2, which shows a side view of a conventional adjusting rod 18, and in FIG. 3, which shows a longitudinal section through a conventional sieve 8, the plates 12 of a sieve 8 have been arranged at an equal distance up to now, as is the case with the slot 16 in the adjusting rod 18. However, since identical plates 12 were used over the entire rod 8, the opening sizes d of the sieve 8 are constant over the length of the sieve.

During operation, the upper sieves are loaded on their front end or in its immediate vicinity with a mixture of grain and undesired crop residues, which reach the sieve via a falling stage which is impinged on with an air flow directed toward the back, whereas the lower sieves are loaded from the upper sieve and, accordingly, also contain more grain in the front area and more impurities in the back area. With both sieves, the air flow leads to a separation between the grain and impurities, so that most of the grain reaches the sieve further in front than the lighter impurities, carried back by the air flow. In this way, separation curves are typically produced in accordance with FIG. 4, in which the solid curve (a) shows the separation of grain and the broken curve (b), the separation of impurities over the length of the sieve 8. One can see that most of the grain is separated in the front half of the sieve, whereas the amount of the separated grain toward the back decreases successively, which is caused by the different striking points of the grain and the impurities on the sieve after the air flow has passed. In the back area of the sieve, the separation of the grain from the impurities is more difficult than in the front area, since whereas in the falling stage and in the front sieve area, a separation takes place according to pneumatic coefficients of the components, there is a greater importance in the back area of the separation according to geometric parameters, so that the adjustment is more sensitive there and the sieve opening has to be adjusted there in a relatively precise manner and must be brought to a rather narrow magnitude, adapted to the grain size, so as to attain an optimal result of the cleaning. Since the sieve opening is adjusted constant and relatively small over the length of the sieve, there is no sufficient separation of the grain then in the front area of the sieve. A greater fraction of the grain accordingly moves back via the sieve and is not sieved out, but rather arrives as lost grain on the field or in the returns conveyor.

In order to avoid the accumulation of excess material quantities in the front area of the sieve, U.S. Pat. No. 7,896,731 B2 proposes the provision of some plates with sections that are wider in the lateral direction and deeper in the longitudinal direction than the other plates in the front area of an upper sieve. All plates of the sieve, however, are at equal intervals from one another and have the same angular positions. In this way, the sieve openings with the aforementioned plates are somewhat larger and a greater air flow penetrates there, from the bottom, through the sieve, so that the separation of grains will be improved, on the one hand, on the aforementioned plates and the impurities will be blown away to a greater extent, on the other hand.

U.S. Pat. No. 7,997,967 B2 describes a sieve in which affixing sections of the plates can be introduced into one of several slots of the sieve frame, so as to produce various angles of the plates and to adapt the sieve to various types of crops. By the selection of various slots, it is also possible to set up various angles for different sections of the sieve.

EP 1 49 351 A1 proposes that the upper sieve and the lower sieve be composed of front and back sections, whose opening size can be changed by means of a common drive. The drive can be uncoupled from the back section, so that only the front section is adjusted and the back section remains in the individual position. This solution refers, above all, to the back part of the upper sieve. This is often further adjusted so as to be able to separate ears which have not yet been threshed to the returns and send them back to the threshing process.

Finally, U.S. Pat. No. 7,566,268 B1 provides plates with only a few fingers, in the middle of the sieve, which are curved in the shape of an arc, are longer and are at a greater distance from one another in the longitudinal and transverse direction than the fingers of the other plates and are meant to be used to bring the corncobs into a longitudinal orientation, in which they penetrate the sieve openings and can remain in them thus forming obstacles for stems and husks moving over the sieve.

The sieves according to U.S. Pat. Nos. 7,896,731 B2 and 7,566,266 B1 have the disadvantage that different types of plates are needed for a single sieve, which complicates the maintaining of a supply inventory and the ordering of spare parts. In the arrangement according to EP 1 849 351 A1, the adjustment of the part of the sieve that is uncoupled from the drive proves to be cumbersome and in the embodiment according to U.S. Pat. No. 7,997,967 B2, relatively large gaps arise between adjacent plates, through which the undesired high quantities of impurities can penetrate, if the front plate is to be set flatter than the plates which follow toward the back.

SUMMARY OF THE INVENTION

According to the present invention under consideration there is provided an improved sieve for a combine harvester cleaning device.

An object of the invention is to provide a sieve in which the sizes of the sieve openings are selected differently over the length of the sieve and, in particular, can also be adapted to the separation curve of the sieve (see FIG. 4), wherein the disadvantages mentioned with regard to the state of the art, however, will be avoided or reduced.

This object is attained by the teaching of claim 1, wherein the dependent claims describe features of advantageous embodiments.

Specifically, there is provided a sieve for a combine harvester cleaning device comprising a frame in which several similar plates that extend transversely to the longitudinal and swiveling direction of the sieve are located in the longitudinal direction of the sieve, one behind the other. The plates are supported in the frame, at the same distances from one another, so they can rotate around their axes, which extend transversely to the longitudinal direction of the sieve and are provided with adjusting elements, which interact with corresponding, suitable features of an adjusting rod, which can adjust its position, relative to the frame, in the longitudinal direction of the sieve. By moving the adjusting rod in the longitudinal direction of the sieve, it is possible to adjust the angles of the plates around their axles and thus the distances between the rear sections and front sections of adjacent plates. The adjusting rod is shaped by a suitable selection of the position of the features in such a way that at least two plates have different angles around their longitudinal axes.

This makes it possible to attain different rotating angles and thus sieve openings over the length of the sieve, without using different types of plates. By having the same distances between the axles on which the plates are affixed on the frame so they can rotate, one avoids larger undesired gaps between adjacent plates, which are pieced at different rotating angles.

Preferably, the features are positioned on the adjusting rod in such a way that the plates in a front area of the sieve are steeper and thus with their back ends, are at greater distances from one another and form larger sieve openings than in a back area of the sieve. In this way, one attains an optimal adaptation to the separation curve (a) of FIG. 4, wherein, any fine intermediate stages of the angles and sieve openings can also be provided over the length of the rod. The sieve opening can, for example, decrease linearly from front to back or increase initially, in accordance with curve (a) of FIG. 4 and, once again, decrease after a maximum. Areas of the sieve with the same sieve openings can also be formed, followed by other areas with other sieve openings, which are, however, similar in size to one another.

Accordingly, the grain can fall, without any problems, in the front area of the sieve, through the larger sieve openings there, whereas the sieve openings in the back area of the sieve can be selected sufficiently small, so as to attain a high purity of the grain in the grain tank. By the greater separation of the grain in the front area of the sieve, the load of the back area of the sieve is also reduced—which makes possible a more sensitive adjustment of the back area of the sieve for the attainment of greater grain purity. Accordingly, the capacity of the sieve with the same sieve quality is increased.

In a preferred embodiment, the adjusting rod is also placed in an adjustable manner, in the vertical direction, by means of an external and/or manually operated positioning drive, wherein the positions of the area, interacting with the adjusting elements of the plates, for one, some, or all features with regard to the longitudinal direction of the sieve change, when the adjusting rod is adjusted in a vertical direction. In particular, the adjusting rod can be shaped in such a way that in a first position of the adjusting rod in the vertical direction, some (that is, at least two) or all plates have different rotating angles, and in a second position of the adjusting rod in the vertical position, all (or at least a number that is larger in comparison to the first position) plates have the same rotating angles. The first position makes possible the already mentioned adaptation to the separating curve (a) of FIG. 4, whereas the second position results in angles of the plates in accordance with FIG. 3, which are the same over the length of the sieve and which [position] proves to be advantageous with some types of crops. Intermediate positions are also possible. Thus, the front/back ratio of the sieve opening can be adjusted.

The adjusting elements are preferably crankshafts and the features, slots in the adjusting rods, into which the crankshafts penetrate.

These and other objects, features, and advantages of this invention will become apparent upon reading of the following detailed description and taking into consideration the drawings.

DESCRIPTION OF THE PREFERRED EMBODIMENT

With regard to FIGS. 1-4, references may be made to the discussion in the previous section headed "Background of the Invention", so that a further discussion is superfluous here.

Figure 5:
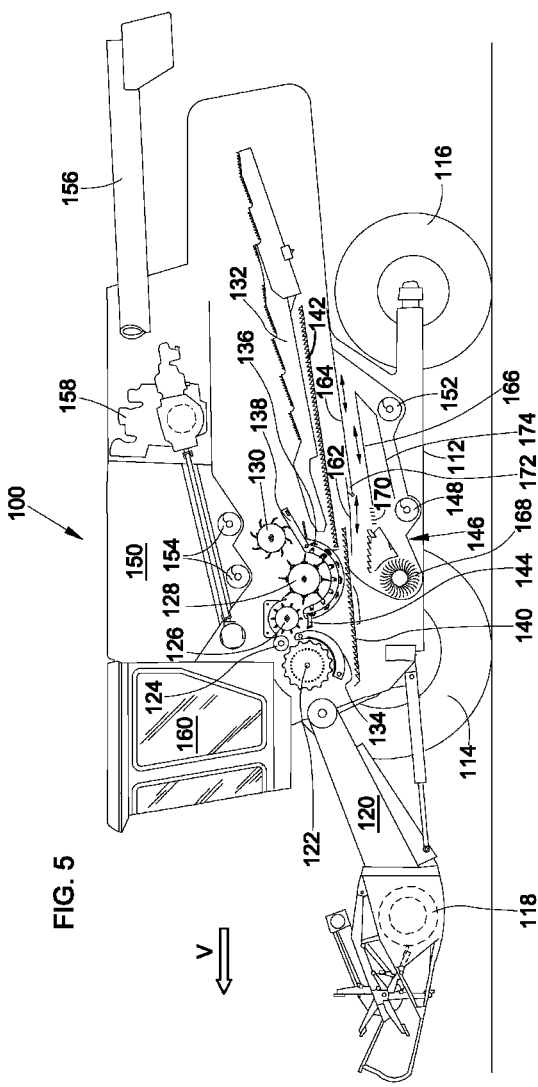
FIG. 5 shows a schematic longitudinal section through a combine harvester with a cleaning device, in which a sieve is used.

FIG. 5 shows a self-propelled combine harvester 103 with a chassis 112, which is supported on the ground by driven front wheels 114 and steerable back wheels 116 and is moved by them. The wheels 114 are rotated by means of driving means (not shown), so as to move the combine harvester 100, for example, over a field which is to be harvested. Below, direction indications, such as front and back, refer to the forward direction of traveling V of the combine harvester 100 in harvesting operation.

A crop harvesting device 118, in the form of a cutting element, is connected, in a detachable manner, to the front end area of the combine harvester 100, so as to harvest crops, in the form of grains or other, threshable cereals, from the field and to move these crops, during the harvesting operation, upwards and backwards to a multi-drum threshing element by means of an inclined conveyor 120; this threshing element comprises in succession in a direction opposite to the traveling direction V, a threshing drum 122, a stripping drum 124, a conveying drum 126 that works from above, a tangential separator 128, and a spiral drum 130. Downstream from the spiral drum 130, there is a straw-walker 132. The threshing drum 122 is surrounded by a threshing basket 134 in its lower and back area. Below the conveyor drum 126, there is a cover 144 that is closed or provided with openings, whereas above the conveyor drum 126, there is a stationary cover and below the tangential separator 128, a separating basket 136 with adjustable finger elements. A finger rake 138 is located below the spiral drum 130.

The grain and impurities mixture going through the threshing basket 134, the separating basket, and the straw-walkers 132 arrives, via conveying trays 140, 142, at a cleaning device 146. Grain cleaned by the cleaning device 146 is conducted, by means of a grain auger 148, to a clean grain elevator (not shown), which conveys it into a grain tank 150. A returns auger 152 sends unthreshed ear parts back to the threshing process through another elevator (not shown). The cleaned grain from the grain tank 150 can be discharged through a discharging system with transverse augers 154 and a discharging conveyor 156. The aforementioned systems are driven by means of a combustion engine 158. The combine harvester 100 is controlled and steered by an operator from a driver's cabin 160.

The cleaning device 146 comprises as blower 168, a preliminary sieve 162, an upper sieve 164, and a lower sieve 166, which is positioned below the upper sieve 164. The sieves 162, 164, 166 are made to move in the same and opposite swiveling directions, during the operation, by suitable crank and eccentric drives; the sieves then oscillate back and forth, as is shown by arrows in FIG. 5. The sieves 162, 164, and 166 are impinged on with air flow by the blower 168 from below. The mixture of grain and impurities first reaches, via the conveying trays 140, 142, the preliminary sieve 162, which is provided with sieve openings in the front area and is closed in the back area. The grain falling through the preliminary sieve 162 can arrive directly at the grain auger 148 after passing through a grate 170 that is upstream from the lower sieve 166. However, it would also be conceivable to replace the grate 170 with a longer lower sieve 166. The rest of the mixture arrives at the upper sieve 164, via a falling stage 172, which receives a flow of air from the blower 168, wherein the grain, for the most part, accumulates in the front area of the sieve 164 and the impurities are blown backwards by the air flow in the falling stage 172 and accumulate, for the most part, in the back area of the upper sieve 164—see FIG. 4 and the pertinent description. Grain falling through the upper sieve 164 falls onto the lower sieve 166, on which a similar distribution of the grain and the impurities is produced as on the upper sieve 166. Grain sieved out from the lower sieve 166 arrives at the grain auger 148 via a conveying tray 174 and grain and impurities felting on the back end of the lower sieve 166 are again conducted, by the returns auger 152, to the threshing process or a subsequent separate thresher, from which they again arrive at the preliminary sieve 162. Material delivered to the back end of the upper sieve 164 is again brought up by rotating chaff spreaders or discharged to the field by a shredder (not shown), located downstream from the straw-walker 132.

Figure 1:
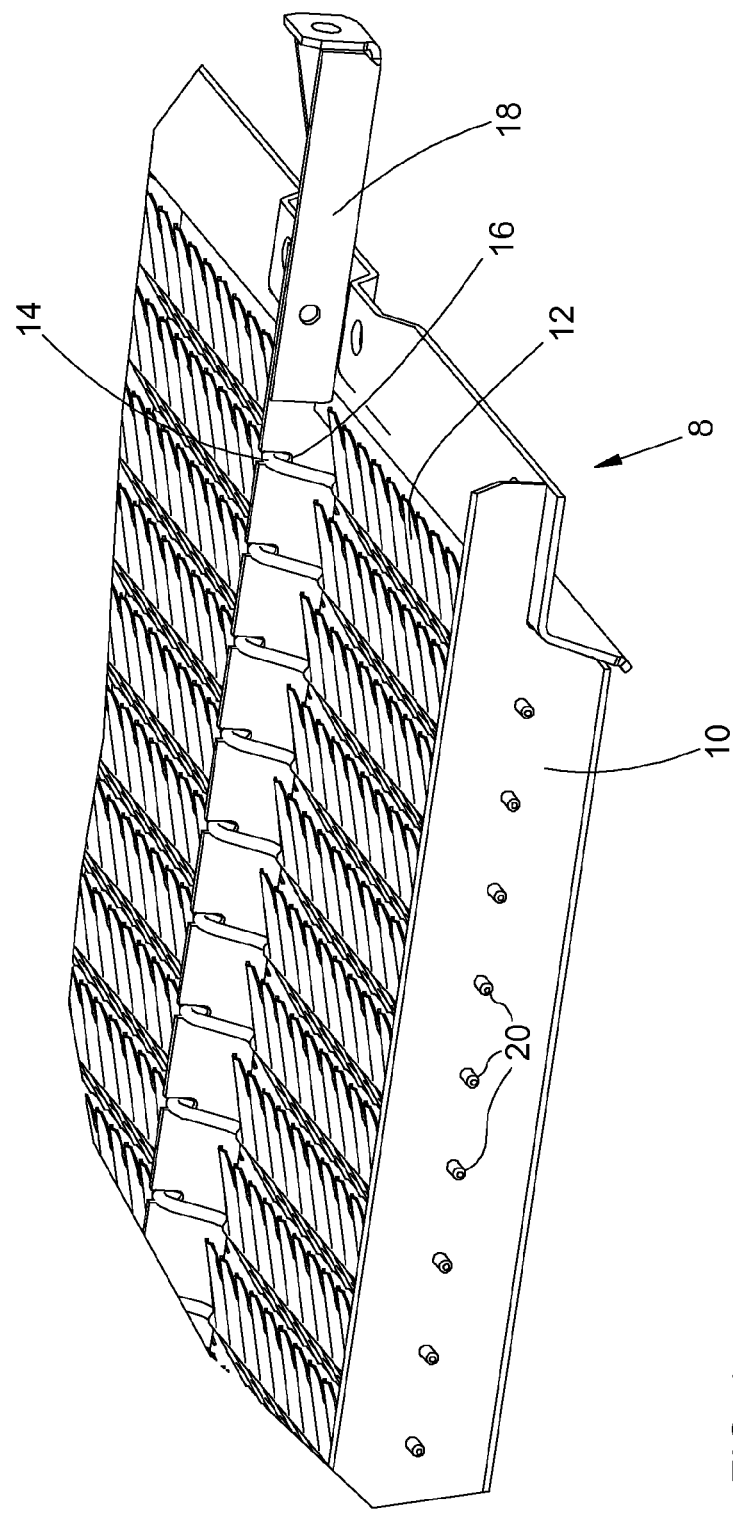
FIG. 1 is a perspective view of a sieve for a combine harvester cleaning device.

The basic mechanical structure of the sieves 164, 166 corresponds to sieve 8 of FIG. 1. The lower sieve 166 accordingly comprises a number of identical plates 12, which are articulated, in a rotatable manner, on the frame 10 of the sieve 166, at the same intervals, and interact with features in the form of slots 16 in one single adjusting rod 18, by means of adjusting elements in the form of crankshafts 14. The plates 12 are bent on their rotating axles 20 and thus extend from the rotating axles 20 on the frame 10, at an incline downwards and forwards, and an upper area 24, which extends (less steeply than the lower area 22) from the rotating axles 20, at an incline upwards and backwards. The upper areas 24 of the plates are curved in a more or less sinusoidal shape in the transverse direction and are provided with undulating indentations on their back ends, as is shown in FIG. 1. It would be possible for one or more plates 12, in particular, on the back end of the sieve 166, to be shaped differently from the other plates 12. Thus, these plates could, for example, be cut out at their side ends, so that when working on the slope, material can fall downwards.

By means of a manually and/or externally operating adjusting drive 30, the adjusting rod 18 is adjusted with a driving rod 32 in the longitudinal and swiveling direction of the sieve 166, so as to adjust the opening size d of the sieve 166 to an optimal value, in which as much grain as possible but few impurities pass through the sieve 166 and as little grain as possible is considered a loss.

Figure 2:
FIG. 2 shows an adjusting rod according to the state of the art.
Figure 3:
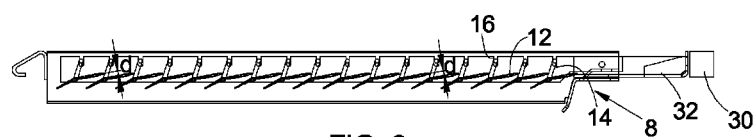
FIG. 3 shows a longitudinal section through a sieve according to the state of the art.
Figure 4:
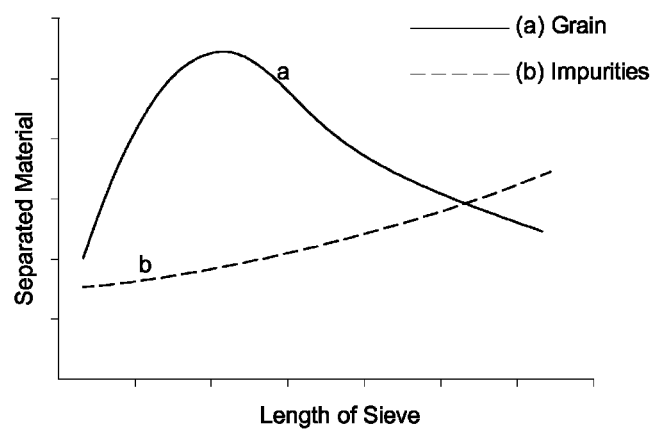
FIG. 4 shows a diagram for the separation of the grain and the impurities over the length of a sieve according to the state of the art.
Figure 6:
FIG. 6 shows an adjusting rod according to a first embodiment example of the invention.
Figure 7:
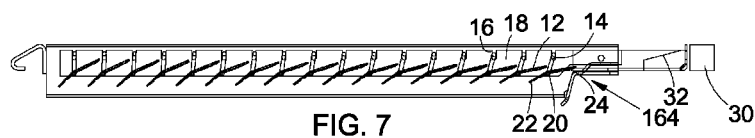
FIG. 7 shows a longitudinal section through a sieve, in which the adjusting rod of FIG. 6 is incorporated.

In a first embodiment of the upper sieve 166, as is shown in FIG. 7, the intervals a1 to a16 between adjacent slots 16, in the corresponding adjusting rod 18, shown in FIG. 6, are selected at least approximately the same when compared with each other, but larger than in the adjusting rod according to FIG. 2. By this positioning of the slots 16 in the adjusting rod 18, one makes it possible for the back areas 24 of the front plates 12 to be relatively steep and the plates 12 following toward the back to be set up somewhat flatter. The sieve opening d is thus not constant over the length of the sieve 166, as in the state of the art according to FIG. 2, but rather decline, successively, toward the back. In this way, the distribution of the mixture of grain and impurities over the length of the sieve 166 and the separation curve of FIG. 4 are taken into account: grain can pass downwards, without any problem, in the front area of the sieve 166; however, the impurities can pass only with difficulty in the back area.

Figure 8:
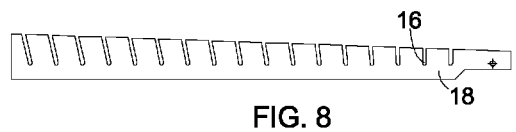
FIG. 8 shows an adjusting rod according to a second embodiment example of the invention.
Figure 9:
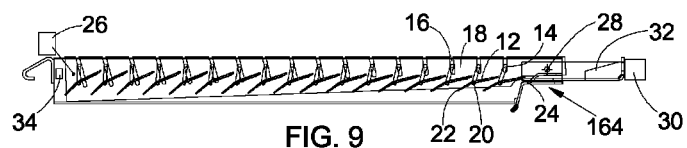
FIG. 9 shows a longitudinal section through a sieve, in which the adjusting rod of FIG. 8 is incorporated and is found in a first position.
Figure 10:
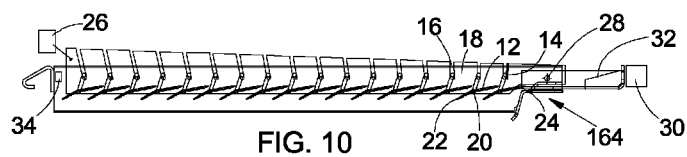
FIG. 10 shows a longitudinal section through a sieve, in which the adjusting rod of FIG. 8 is incorporated and is found in a second position.

In the second embodiment according to FIGS. 8-10, the adjusting rod 18 is provided with longer, upright slots 16 having upper open ends, wherein the last three slots 16 in the back area of the adjusting rod 18 are substantially vertically oriented and the slots 16 in the front area are slightly inclined forwards and upwards. A manually or externally operated positioning drive 26 is used for the vertical adjustment of the front end of the adjusting rod 18. The back end of the adjusting rod 18 is coupled with the driving rod 32, via a pivot pin 28, with the driving rod 32 and adjusting rod 18 being movable longitudinally by means of the adjusting drive 30.

The second embodiment makes it possible to bring the adjusting rod 18 into the first position, in accordance with the FIG. 9, in which it is brought downwards, as much as possible, and the crankshafts 14 interact with the slots 16 in the vicinity of the upper ends of the slots 16. Since the intervals $a_1$ to $a_{16}$ between the slots 16 are identical there with the intervals $a_1$ to $a_{16}$ between the slots in accordance with FIG. 6, the angles of the plates 12 then correspond to their positions in the first embodiment of FIG. 7, as can be seen in FIG. 9.

Furthermore, the adjusting rod 18 can be brought, by the positioning drive 26, into the second position in accordance with FIG. 10, in which it is moved upwards, as much as possible, and the crankshafts 14 interact with the slots 16 in the vicinity of the lower ends of the slots 16. Since the intervals $a_1$-$a_{16}$ of the slots 16 are identical, there with the intervals $a_1$-$a_{16}$ of the slots according to FIG. 2, the angles of the plates 12 then correspond to their positions in accordance with the state of the art and are also identical, as can be seen in FIG. 10.

The positioning drive 26 also makes possible a continuous or stepwise adjustment of any intermediate positions between the first and second positions. In this way, the dependence of the plate angles and sieve openings d on the individual position of the plate 12 along the sieve 166 can be set to a value that is optimally adapted to one of the crop types. This adjustment can be carried out manually on site or be externally actuated from the cabin 160, wherein in the second case, a manual input or an automatic system can be used, which can undertake the adjustment automatically, for example, with the aid of the type of crop and/or the crop throughput recorded by a suitable sensor and/or with the aid of the quantity of the material on the lower sieve 166, recorded by a suitable sensor, and/or with the aid of the lost grain rate, recorded by a suitable sensor, and/or with the aid of the quantity and/or grain rate of the returns, recorded by a suitable sensor. The automatic system then also automatically controls the adjusting drive 30. In the cabin 160, an indication regarding the set sieve opening sizes can be made to the operator; it can show, for example, the sieve opening in the back area and a ratio between the sieve opening in the front area and the sieve opening in the back area.

In the first position according to FIG. 9, the adjusting area of the adjusting drive 30 is smaller than in the second position according to FIG. 10 as a result of the already steeper front plates 12, so that the movement area of the adjusting drive 30 can be limited by a suitable stop 34, moved by the positioning drive 26, which is positioned as a function of the vertical position of the adjusting rod 18. Alternatively, a control of the positioning drive 26 and the adjusting drive 30 could automatically take into consideration the actual position of the adjusting rod 18, so as to prevent an excessive opening of plates 12.

One should also note that the adjusting rod 18 could also be composed of several sections which are connected rigidly with one another. It would also be conceivable to place the positioning drive 26 on the back side of the sieve 166 and to place the pivot pin 28 on the front side of the sieve 166, wherein, then, the form of the slots 16 would be correspondingly adapted, so as to retain the described mode of action or one would then have to track the adjusting drive 30 with an actuation of the positioning drive 26, so as to attain the desired opening sizes. In addition, the adjusting rod 18 could be located below the sieve 166. Finally, the upper sieve 164 can also be constructed in accordance with one of the embodiments of the invention according to FIGS. 6-10.

Having described the preferred embodiment, it will become apparent that various modifications can be made without departing from the scope of the invention as defined in the accompanying claims.

The invention claimed is:

1. In a sieve (166) for a cleaning device (146) of a combine harvester (100), the sieve (166) including a frame (10) extending longitudinally between front and rear ends, as considered in a working position within the harvester (100), with the front and rear ends being joined together by opposite transversely spaced longitudinally extending upright frame members, a plurality of similar plates (12) extending transversely between the upright frame members, the plurality of plates (12) each being inclined upwards and rearwards so that adjacent plates have a rear section of one overlapping a front section of the other, the plates (12) respectively being joined to a plurality of transverse axles (20) mounted for pivotal movement in the frame (10), with the axles (20) being equally spaced longitudinally from each other and being respectively associated with a plurality of adjustment elements (14), with each adjustment element (14) being configured for being moved back-and-forth in the longitudinal direction in response to pivotal movement of the associated axle to effect swiveling of an associated one of the plates (12), and a longitudinally extending adjusting rod (18) having a plurality of adjustment features (16) respectively operably connected to said plurality of adjustment elements (14) for interacting with said plurality of adjustment elements (14) and being adjustable in the longitudinal direction of the sieve (166), relative to the frame (10), so as to adjust the angles of the plates (12) around their respective axles (20) and thus adjust a spacing between the rear sections and front sections of adjacent plates (12) of the plurality of plates, by moving the adjusting rod (18) in the longitudinal direction of the sieve (166), the improvement comprising: said plurality of features (16) being positioned on the adjusting rod (18) in such a way that adjacent ones of the plurality of plates (12) in a front area of the sieve (166) are angled steeper than are adjacent ones of the plurality of plates in a rear area of the sieve (166) whereby the space between the front and rear sections of the adjacent plates in the front area of the sieve (166) is greater than the space between the front and rear sections of the adjacent ones of the plurality of plates in the rear area of the sieve (166).

2. The sieve (166) according to claim 1, wherein the plurality of adjustment features (16) are positioned on the adjusting rod (18) in such a way that the angles of the plurality of plates (12) are successively flatter from front to rear of the sieve (166).

3. The sieve (166) according to claim 2, wherein the plurality of adjustment features (16) are positioned on the adjusting rod (18) in such a way that the angles of the plates (12) are linearly flatter from front to rear of the sieve (166).

4. The sieve (166) according to claim 1, wherein the adjusting rod (18) is mounted to the frame (10) for adjustment in a vertical direction relative to the frame (10).

5. The sieve (166) according to claim 4, wherein an externally actuated positioning drive (26) is coupled for effecting the adjustment of the adjusting rod 18 in the vertical direction.

6. The sieve (166) according to claim 5, wherein the adjusting rod (18) is shaped in such a manner that the positions of the plurality of adjustment features (16) respectively interacting with the plurality of adjustment elements (14) change in the longitudinal direction of the sieve (166), in response to the adjusting rod (18) being adjusted in the vertical direction.

7. The sieve (166) according to claim 4, wherein the adjusting rod (18) is shaped in such a manner that in a first vertical position of the adjusting rod (18), at least a first number of the plurality of plates (12) have different angles, and in a second vertical position of the adjusting rod (18), at least a second number of the plurality of plates have the same angles, this second number being larger than said first number.

8. The sieve (166) according to claim 5, and further including an adjusting drive (30) having a driving rod (32) located adjacent a rear end of the adjusting rod (18); a pivot pin (28) coupling the adjusting rod (18) to the driving rod (32) for pivoting vertically, the driving rod (32), in turn, be movable longitudinally by the adjusting drive (30);

and the positioning drive (26) being located adjacent a forward end of the adjusting rod (18).

9. The sieve (166) according to claim 1, wherein the plurality of adjusting elements are a plurality of crankshafts (14) and the plurality of adjustment features (16) are slots in the adjusting rod (18).

\* \* \* \* \*